US012772279B2

(12) United States Patent
Gan et al.

(10) Patent No.: US 12,772,279 B2
(45) Date of Patent: Oct. 20, 2026

(54) SYSTEMS AND METHODS FOR CONNECTING DEVICES TO A BASE STATION BASED ON A SIGNAL STRENGTH THRESHOLD OF THE BASE STATION

(71) Applicant: Verizon Patent and Licensing Inc., Basking Ridge, NJ (US)

(72) Inventors: Seng Gan, Ashburn, VA (US); Muhammad Ebad Ullah, Allen, TX (US); Andrew F. Patka, Holliston, MA (US); Fahad Zia, Concord, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 517 days.

(21) Appl. No.: 18/054,761

(22) Filed: Nov. 11, 2022

(65) Prior Publication Data

US 2023/0422285 A1 Dec. 28, 2023

Related U.S. Application Data

(63) Continuation-in-part of application No. 17/808,821, filed on Jun. 24, 2022, now Pat. No. 12,219,393.

(51) Int. Cl.

| | |
|---|---|
| ***H04W 72/04*** | (2023.01) |
| ***H04B 17/318*** | (2015.01) |
| ***H04W 48/20*** | (2009.01) |
| ***H04W 72/08*** | (2009.01) |
| ***H04W 72/52*** | (2023.01) |
| ***H04W 72/542*** | (2023.01) |
| *H04W 76/10* | (2018.01) |

(52) U.S. Cl.
CPC ........ *H04W 72/542* (2023.01); *H04B 17/318* (2015.01); *H04W 48/20* (2013.01); *H04W 72/52* (2023.01); *H04W 76/10* (2018.02)

(58) Field of Classification Search
CPC ... H04W 72/542; H04W 48/20; H04W 72/52; H04W 76/10; H04W 36/22; H04W 24/02; H04W 72/29; H04W 28/0861; H04B 17/318
See application file for complete search history.

(56) References Cited

U.S. PATENT DOCUMENTS

| | | | | |
|---|---|---|---|---|
| 10,560,204 | B1 * | 2/2020 | Patel | H04W 48/12 |
| 10,608,729 | B1 * | 3/2020 | Youtz | H04W 24/02 |
| 10,841,023 | B2 * | 11/2020 | Patel | H04W 48/18 |
| 10,841,853 | B1 * | 11/2020 | Yousefi'zadeh | G06N 20/00 |

(Continued)

*Primary Examiner* — Luat Phung

(57) ABSTRACT

A network management system may provide, to a base station, a request for base station device information regarding devices connected to the base station. The base station may be identified by a fixed wireless access (FWA) device. The network management system may receive, based on the request, the base station device information from the base station. The base station device information may indicate a quantity of the devices connected to the base station and signal strengths of the devices connected to the base station. The network management system may determine a load of the base station based on the quantity of the devices and the signal strengths of the devices and determine a signal strength threshold associated with the base station based on the load. The network management system may cause a connection to be established between the FWA device and the base station based on the signal strength threshold.

20 Claims, 8 Drawing Sheets

(56) References Cited

U.S. PATENT DOCUMENTS

| | | | | |
|---|---|---|---|---|
| 11,985,589 | B2 | 5/2024 | Zong | |
| 2004/0236850 | A1* | 11/2004 | Krumm | H04L 67/04 709/224 |
| 2008/0316985 | A1* | 12/2008 | Kostic | H04W 28/0205 370/338 |
| 2014/0133327 | A1* | 5/2014 | Miyauchi | H04W 72/542 370/252 |
| 2015/0312771 | A1* | 10/2015 | Li | H04W 24/02 455/446 |
| 2017/0207956 | A1* | 7/2017 | Cabral | H04W 28/021 |
| 2019/0261233 | A1 | 8/2019 | Duan | |
| 2021/0058146 | A1* | 2/2021 | Eichen | H04B 7/1851 |
| 2021/0219143 | A1* | 7/2021 | Khalid | H04W 8/005 |
| 2022/0360972 | A1* | 11/2022 | Ross | H04W 4/80 |
| 2023/0068860 | A1 | 3/2023 | Sun | |
| 2023/0328538 | A1* | 10/2023 | Kappes | H04W 16/24 |
| 2023/0397285 | A1* | 12/2023 | Wiemann | H04W 76/15 |
| 2024/0114410 | A1* | 4/2024 | Nakazato | H04W 36/22 |
| 2024/0184624 | A1* | 6/2024 | Tanach | G06F 9/544 |

* cited by examiner

SYSTEMS AND METHODS FOR CONNECTING DEVICES TO A BASE STATION BASED ON A SIGNAL STRENGTH THRESHOLD OF THE BASE STATION

RELATED APPLICATION

This application is a continuation-in-part of U.S. patent application Ser. No. 17/808,821, entitled "SYSTEMS AND METHODS FOR DETERMINING LOADS OF BASE STATIONS FOR CONNECTION WITH FIXED WIRELESS ACCESS DEVICES," filed Jun. 24, 2022, which is incorporated herein by reference in its entirety.

BACKGROUND

A base station (e.g., an eNodeB and/or a gNodeB, among other examples) is a hardware component that connects a core network to an end user mobile device (e.g., a user equipment (UE)). In some situations, the base station may establish a connection with a fixed wireless access device to provide Internet access to user devices connected to the fixed wireless access device.

DETAILED DESCRIPTION OF PREFERRED EMBODIMENTS

Figure 1A:
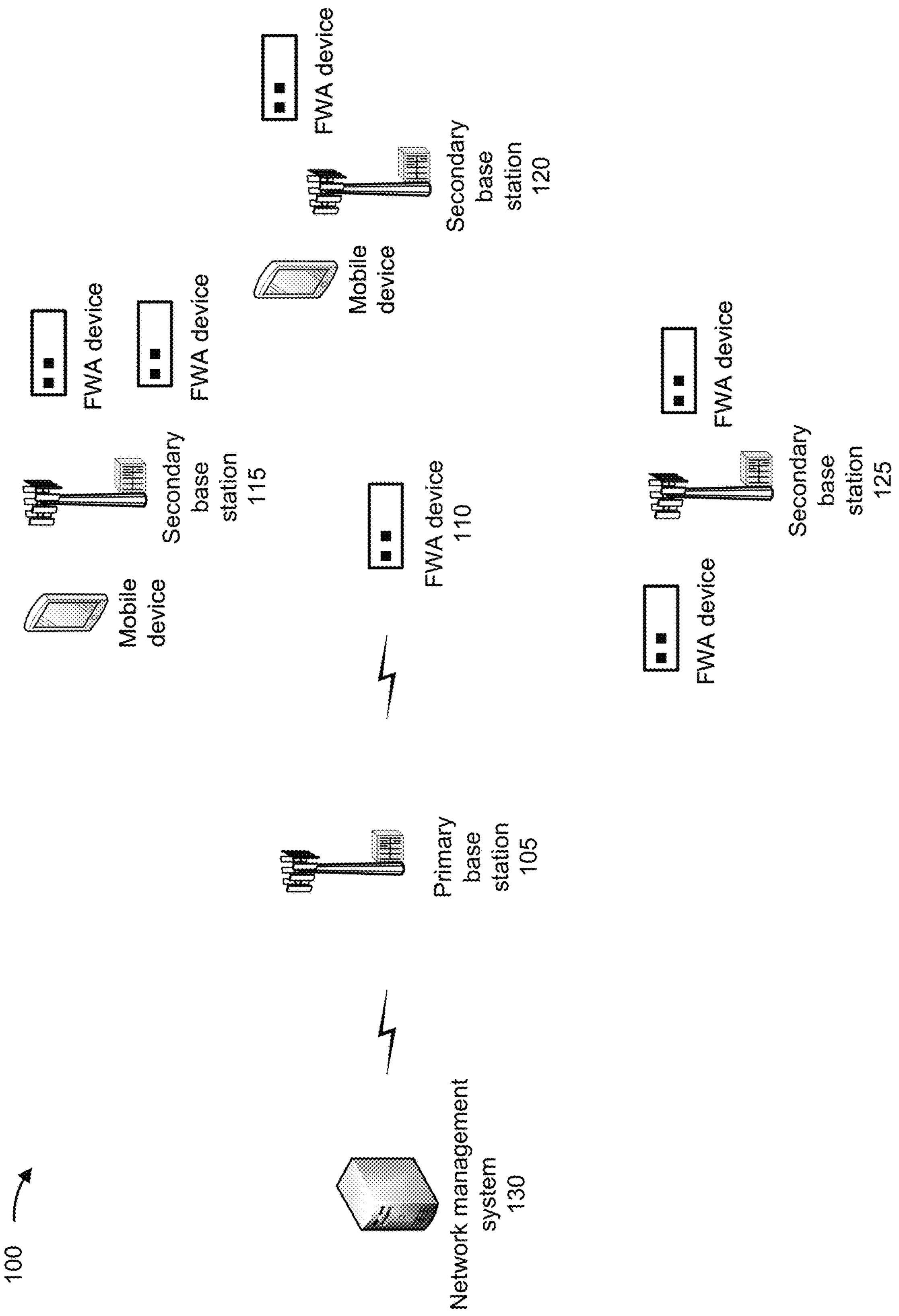
FIGS. 1A-1E are diagrams of an example associated with connecting devices to a base station based on a signal strength threshold of the base station.

The following detailed description of example implementations refers to the accompanying drawings. The same reference numbers in different drawings may identify the same or similar elements.

A base station may operate in accordance with a fifth generation (5G) standalone architecture (SA). The base station may include a gNodeB and may hereinafter be referred to as "5G base station." In some situations, a mobile device may establish a connection with the 5G base station based on a frequency band of the 5G base station. Due to the concept of mobility of 5G SA, the mobile device may establish the connection with the 5G base station irrespective of a load associated with the 5G base station. The mobile device may establish the connection with the 5G base station in this manner because the connection is temporary. For example, the connection may be established for a second or less. Because the connection is temporary, the load associated with the 5G base station may not affect data received by the mobile device via the 5G base station.

In a 5G non-standalone architecture (NSA), a fixed wireless access (FWA) device may establish a connection with a base station. The base station may operate in accordance with fourth generation (4G) long term evolution (LTE). The base station may include an eNodeB and may hereinafter be referred to as "4G base station." The FWA device may be provided on a customer premises. The FWA device may establish the connection with the 4G base station to enable the 4G base station to provide Internet access to the FWA device (e.g., based on an Internet service subscription associated with the FWA device).

Because 5G NSA currently operates based on the concept of mobility of 5G SA, the 4G base station (to which the FWA device is connected) may cause a 5G base station, of the plurality of 5G base stations, to establish a connection with the FWA device irrespective of a load associated with the 5G base station. In some situations, the 4G base station may cause the 5G base station to establish the connection based on a priority associated with frequency bands associated with the 5G base stations. The 4G base station may cause the 5G base station to establish the connection to enable the 5G base station to act as a secondary source (or secondary node) with respect to the provisioning of Internet access to the FWA device.

Due lack of mobility, the FWA device may remain connected to the 4G base station and to the 5G base station for a long period of time (e.g., for multiple months until the Internet service subscription is terminated). In some situations, the 5G base station may become overloaded. As a result of the 5G base station becoming overloaded, a measure of speed of the Internet service may be degraded.

Based on the measure of speed of the Internet service being degraded, the FWA device may attempt to reboot and/or to perform a re-configuration multiple times. Rebooting and/or performing the re-configuration in this manner may consume network resources and/or computing resources, among other resources.

Implementations described herein are directed to a base station establishing a connection with a device based on a signal strength threshold of the base station. The base station may be a base station of an LTE wireless network or a base station of a 5G wireless network. For example, the base station may be an eNodeB or a gNodeB. The load of the base station may be determined based on the quantity of devices connected to the base station. In some situations, the devices connected to the base station may include mobile devices and/or FWA devices. In this regard, the load of the base station may be determined further based on signal strengths measured by the FWA devices connected to the base station. For example, the signal strengths will be measured by the FWA devices based on signals from the base station.

Unlike the mobile devices, the FWA devices are stationary. Accordingly, a signal strength of the signals, from the base station, received by an FWA device is generally constant. In this regard, a signal strength measured by a first FWA device, closer to the base station than a second FWA device, generally exceeds a signal strength measured by the second FWA device. Because of the different distances between the FWA devices and the base station, the FWA devices may cause different loads on the base station as a result of a same amount of data being transmitted between the FWA devices and the base station. For example, because the signal strength measured by the first FWA device exceeds the signal strength measured by the second FWA device, the second FWA device may cause a load that exceeds a load caused by the first FWA device (e.g., as a result of the same amount of data being transmitted). This is because it may take longer for the second FWA device to transmit the same amount of data.

Because the signal strengths of the FWA devices are constant and because the loads caused by the FWA devices depend on the signal strengths measured by the FWA devices, the load of the base station may be determined further based on signal strengths measured by the FWA devices connected to the base station and without signal strengths measured by the mobile devices connected to the base station. A signal strength threshold, associated with the base station, may be determined based on the load of the base station.

The signal strength threshold may be used to determine whether the base station is to establish a connection with a device. For example, the base station may establish the connection with the device based on a signal strength of the device (e.g., measured by the device) satisfying the signal strength threshold. In some instances, the device may be a mobile device. Alternatively, the device may be an FWA device. In some instances, when measuring the signal strength, the device may determine a reference signal received power (RSRP) measurement, a channel quality indicator (CQI) measurement, a signal to interference plus noise ratio (SINR) measurement, and/or a reference signal received quality (RSRQ) measurement.

In some situations, the base station may establish the connection with the device as part of a network entry procedure between the base station and the device (e.g., a procedure to enable communications between the base station and the device). Alternatively, the base station may establish the connection with the device as part of a handover procedure (e.g., to disconnect the device from another base station and to connect the device to the base station). Alternatively, the base station may establish the connection with the device to enable the base station to act as a secondary source (or secondary node) with respect to provisioning of Internet access to the device.

The signal strength threshold may be dynamically adjusted based on the load. For example, the signal strength threshold may be increased as the load increases. Alternatively, the signal strength threshold may be decreased as the load decreases.

By causing the connection to be established based on the signal strength threshold as described herein, implementations described herein may preserve the network resources and/or the computing resources, among other resources that would have otherwise been used to reboot the FWA device and/or perform a re-configuration of the FWA device.

FIGS. 1A-1E are diagrams of an example 100 associated with connecting devices to a base station based on a signal strength threshold of the base station. As shown in FIGS. 1A-1E, example 100 includes a primary base station 105, an FWA device 110, a plurality of secondary base stations (e.g., secondary base station 115, secondary base station 120, and/or secondary base station 125), and a network management system 130.

In some examples, primary base station 105 may include an eNodeB. In some situations, primary base station 105 may maintain an anchoring relationship with respect to the plurality of secondary base stations. In other words, primary base station 105 may be configured to cause a secondary base station to establish a connection with FWA device 110. The secondary base station may establish the connection in order for the secondary base station to act as a secondary source (or secondary node) with respect to the provisioning of Internet access to FWA device 110.

FWA device 110 may include a communication device and a computing device. For example, FWA device 110 may include a customer premises equipment (CPE), an antenna, a transceiver, and/or a router, among other examples. FWA device 110 may be configured to establish a connection with a base station to provide Internet access to mobile devices connected with FWA device 110. The mobile devices may include a mobile phone, a user equipment, a laptop computer, a tablet computer, and/or a desktop computer, among other examples.

In some examples, a secondary base station may include a gNodeB. The secondary base station may be associated with multiple sectors corresponding to respective antennas, of the secondary base station, that are facing in respective directions. As shown in FIG. 1A, one or more devices may be connected to a secondary base station. The one or more devices may include one or more FWA devices and/or one or more mobile devices (e.g., a mobile phone, a user equipment, a laptop computer, a tablet computer, and/or a desktop computer, among other examples).

Network management system 130 may include one or more devices configured to determine a load of a base station and determine a signal strength threshold associated with the base station based on the load. The signal strength threshold may be used to determine whether the base station is to establish a connection with a device. Network management system 130 may provide threshold information regarding the signal strength threshold.

In the example described herein, network management system 130 may provide, to primary base station 105, threshold information regarding a signal strength threshold associated with a secondary base station. Primary base station 105 may maintain an anchoring relationship with respect to the secondary base station. Accordingly, primary base station 105 may be configured to cause the secondary base station to establish a connection with the device (e.g., FWA device 110) based on the signal strength threshold identified by the threshold information.

While the foregoing example has been described with respect to a secondary base station establishing the connection with the device to enable the secondary base station to act as a secondary source, implementations described herein are also directed to a base station establishing the connection with the device as part of a network entry procedure. Alternatively, or alternatively, implementations described herein are directed to a base station establishing the connection with the device as part of a handover procedure.

Figure 1B:
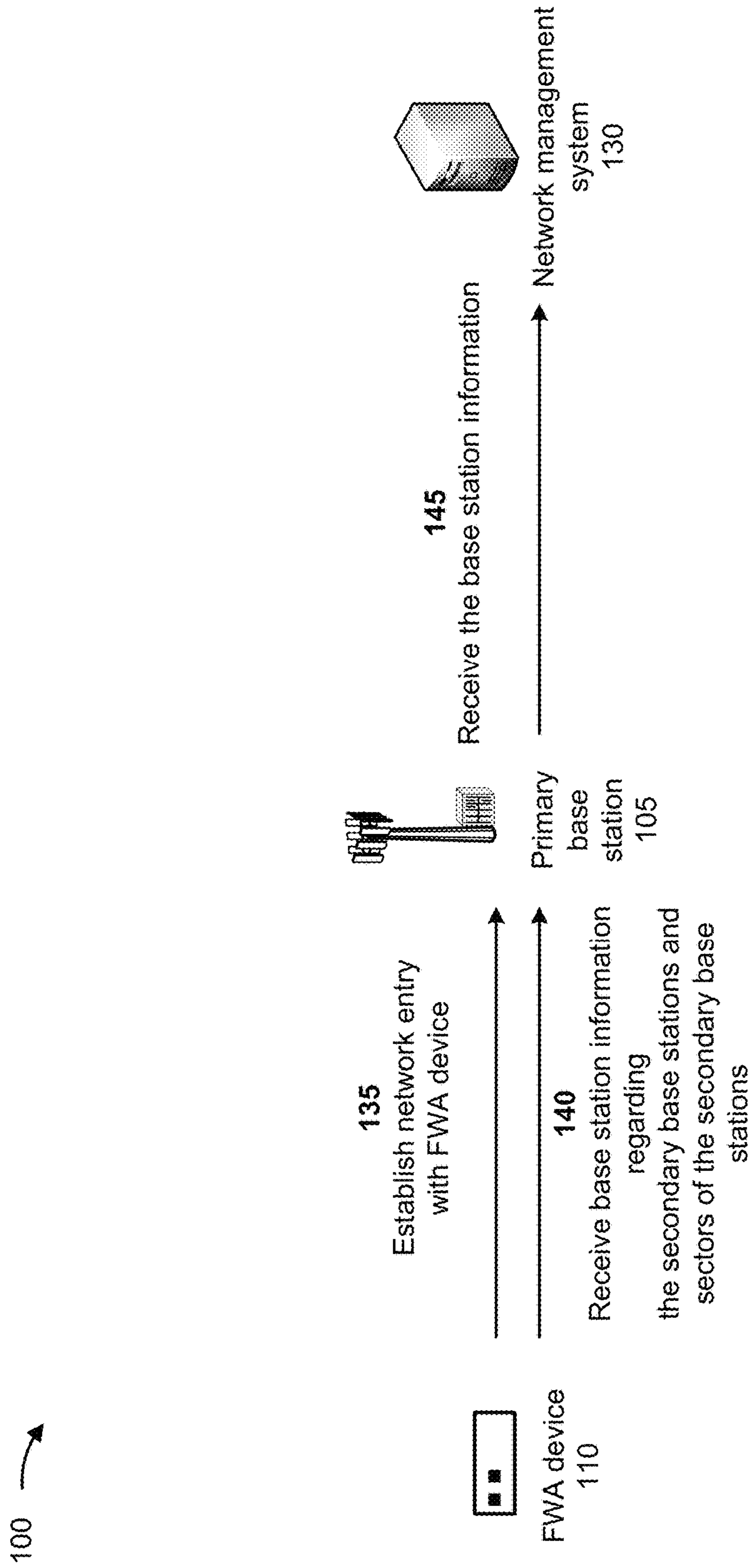

As shown in FIG. 1B, and by reference number 135, primary base station 105 may establish a network entry with FWA device 110. For example, FWA device 110 may be configured to provide a request, to primary base station 105, to establish a network entry. Accordingly, upon being initialized, FWA device 110 may provide the request to establish the network entry with primary base station 105. Based on receiving the request from FWA device 110, primary base station 105 may establish the network entry with FWA device 110.

Primary base station 105 may establish the network entry based on a signal strength threshold associated with primary base station 105. For example, primary base station 105 may establish the network entry based on a signal strength (measured by FWA device 110) satisfying the signal strength threshold, as described herein. The signal strength may be measured by FWA device 110 may be based on signals broadcasted by primary base station 105 and received by FWA device 110. The signal strength threshold may be determined periodically based on a load associated with the primary base station 105, as explained herein. For example, the signal strength threshold may be determined every thirty minutes, every hour, among other examples. The signal strength threshold may be adjusted based on the load associated with primary base station 105. In some implementations, the load associated with primary base station 105 may be determined based on a quantity of devices connected to primary base station 105 and/or based on signal strengths measured by FWA devices that are connected to primary base station 105, as explained herein.

As shown in FIG. 1B, and by reference number 140, primary base station 105 may receive base station information regarding the secondary base stations and sectors of the secondary base stations. In some implementations, FWA device 110 may be configured to provide the base station information to primary base station 105 after establishing the connection with primary base station 105 (e.g., after establishing an initial connection with primary base station 105). In this regard, primary base station 105 may receive the base station information from FWA device 110 after establishing the connection with FWA device 110.

In some examples, when installed at a customer premises, an antenna of FWA device 110 may be directed toward one or more sectors of a secondary base station. For instance, FWA device 110 may be directed toward a first sector of secondary base station 115, toward a second sector of secondary base station 120, toward a third sector of secondary base station 125, among other examples. In this regard, the base station information may include information identifying secondary base station 115, information identifying the first sector, information identifying secondary base station 120, information identifying the second sector, and so on.

By way of example, the information identifying secondary base station 115 may include a serial number of secondary base station 115, and/or a location (e.g., geographical coordinates) of secondary base station 115, among other examples. By way of example, the information identifying the first sector may include information identifying an antenna of secondary base station 115.

As shown in FIG. 1B, and by reference number 145, network management system 130 may receive the base station information.

Figure 1C:
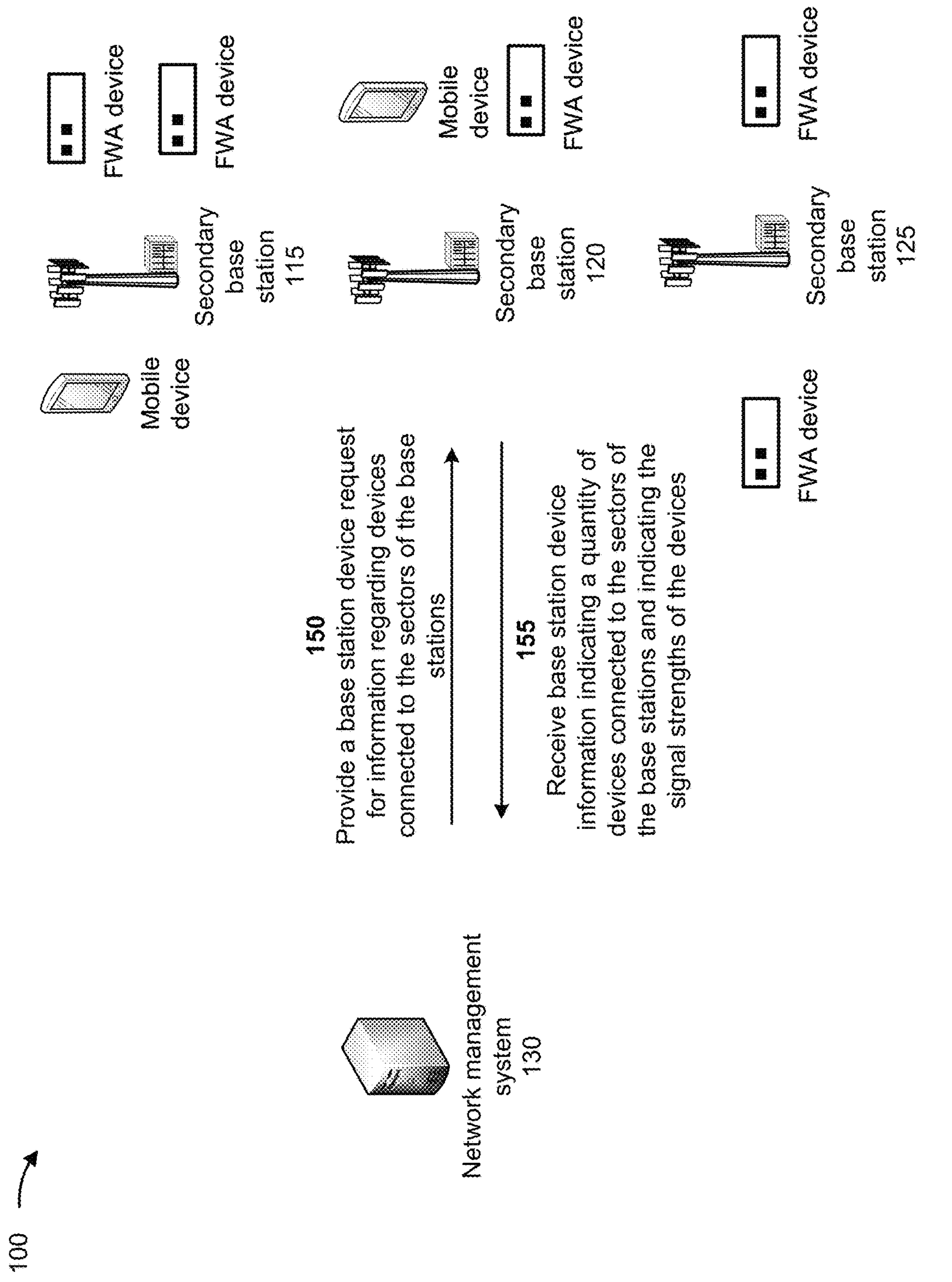

As shown in FIG. 1C, and by reference number 150, network management system 130 may provide a base station device request for devices connected to the sectors of the secondary base stations. For example, based on receiving the base station information, network management system 130 may provide the base station device request to obtain information regarding the devices connected to the sectors, of the secondary base stations, identified in the base station information.

In some implementations, network management system 130 may provide a first base station device request to secondary base station 115, provide a second base station device request to secondary base station 120, provide a third base station device request to secondary base station 125, and so on. The first base station device request may include information identifying the first sector of secondary base station 115, the second base station device request may include information identifying the second sector of secondary base station 120, the third base station device request may include information identifying the third sector of secondary base station 125, and so on.

As shown in FIG. 1C, and by reference number 155, network management system 130 may receive base station device information indicating devices connected to sectors of secondary base stations. For example, based on providing the base station device request, network management system 130 may receive the base station device information indicating the devices connected to each sector of the sectors identified in the base station information. In some implementations, network management system 130 may receive the base station device information from the secondary base stations and/or from one or more network devices associated with the secondary base stations. For example, network management system 130 may receive, from secondary base station 115, information indicating devices connected to the first sector; receive, from secondary base station 120, information indicating devices connected to the second sector; receive, from secondary base station 125, information indicating devices connected to the third sector, and so on.

In some implementations, the base station device information, for each sector, may indicate a quantity of devices connected to the sector, types of the devices connected to the sector (e.g., a mobile device or an FWA device), signal strengths measured by the devices, and/or information identifying the devices, among other examples. For example, the base station device information, for each sector, may indicate a quantity of FWA devices connected to the sector, a signal strength measured by each FWA device (e.g., an RSRP measurement, a CQI, an SINR measurement, and/or an RSRQ measurement), and/or information identifying each FWA device (e.g., a serial number of each FWA device and/or a network address of each FWA device, among other examples). Each FWA device may be configured to report the signal strength to the secondary base station (e.g., report the signal strength periodically and/or report the signal strength based on a trigger).

Additionally, or alternatively, the base station device information, for each sector, may indicate a quantity of mobile devices currently connected to the sector, different quantities of mobile devices connected to the sector at different periods of time, a signal strength measured by each mobile device, and/or information identifying each mobile device. Each mobile device may be configured to report the signal strength to the secondary base station. The information identifying a mobile device may include a mobile directory number of the mobile device, an international mobile equipment identity number of the mobile device, and/or a serial number of the mobile device, among other examples.

In some implementations, the base station device information may include information identifying a service plan associated with each FWA device. In some examples, the service plan, for a particular FWA device, may be a data plan and may indicate an amount of data allocated for the particular FWA device. In some implementations, the base station device information may include information identifying an amount of data consumed by each mobile device (e.g., over a period of time).

Figure 1D:
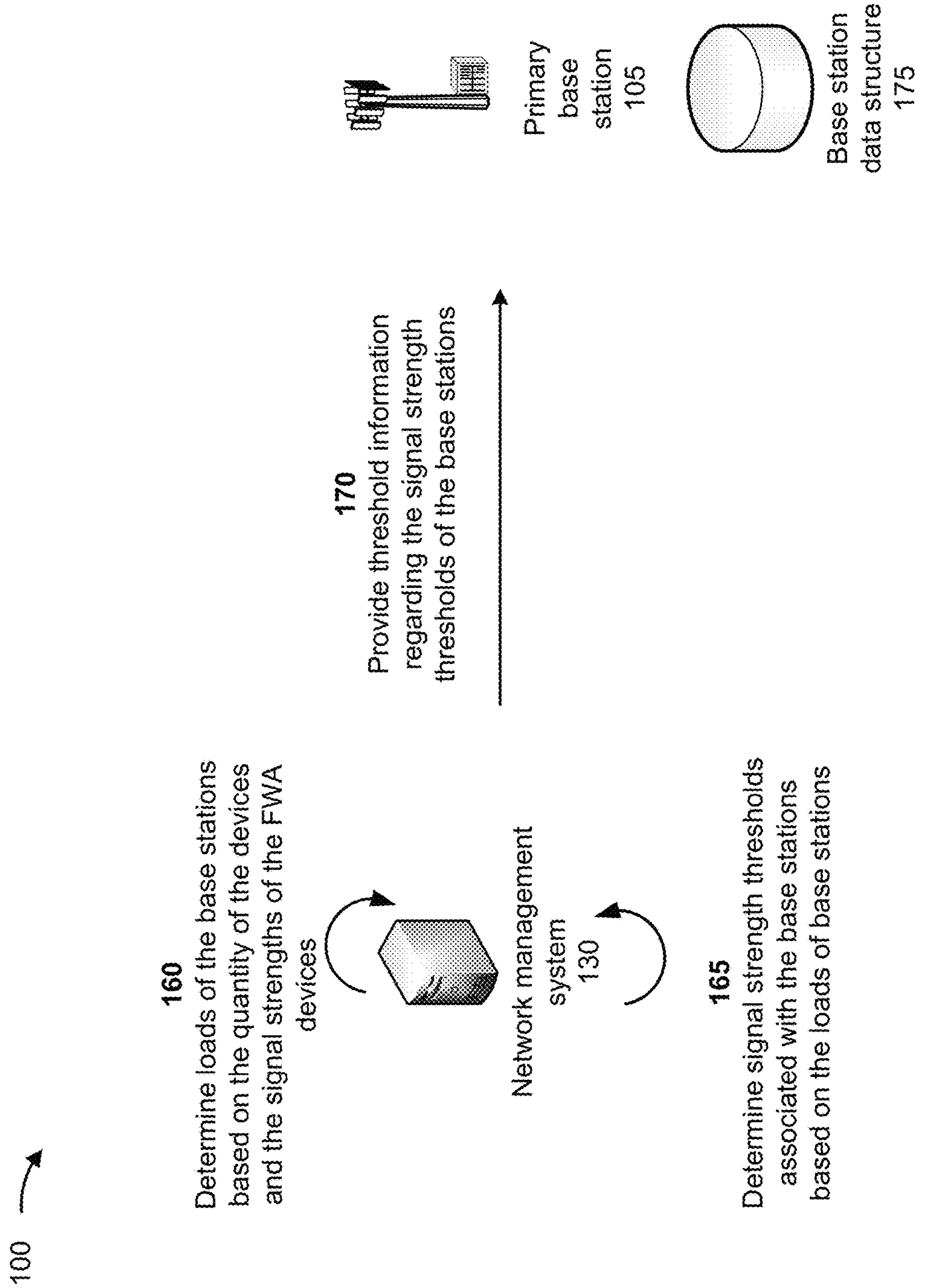

As shown in FIG. 1D, and by reference number 160, network management system 130 may determine the loads of the secondary base stations based on the quantity of the devices and the signal strengths of the FWA devices. For example, network management system 130 may determine the load of secondary base station 115 based on the base station device information received from secondary base station 115. The base station device information may include information regarding the one or more devices connected to the first sector as identified in the base station device information.

In some implementations, network management system 130 may determine the load of secondary base station 115 based on the quantity of FWA devices that are connected to the first sector and/or based on the quantity of mobile devices that are connected to the first sector. For example, network management system 130 may determine the load of secondary base station 115 based on the quantity of FWA devices that are connected to the first sector and based on the signal strengths measured by the FWA devices. For example, network management system 130 may determine the load of secondary base station 115 by multiplying the quantity of FWA devices and the signal strengths measured by the FWA devices.

For instance, network management system 130 may determine the load of secondary base station 115 using the following formula:

FWA(n)*Signal_Strength(n)

where FWA(n) represents an FWA device n and where Signal_Strength(n) represents the signal strength measured by the FWA device n.

Network management system 130 may perform the calculation for each FWA device and combine (e.g., add) results of the calculations to determine the load of secondary base station 115. Additionally, or alternatively, network management system 130 may determine the load of secondary base station 115 based on a quantity of FWA devices associated with each service plan, a factor associated with each service plan, and the signal strengths measured by the FWA devices.

For instance, network management system 130 may determine the load of secondary base station 115 using the following formula:

FWA(n)*Signal_Strength(n)*Scale(n)

where FWA(n) represents an FWA device n, where Signal_Strength(n) represents the signal strength measured by the FWA device n, and where Scale(n) represents the factor associated with the service plan of the FWA device n.

Network management system 130 may perform the calculation for each FWA device and combine (e.g., add) results of the calculations to determine the load of secondary base station 115. In some examples, network management system 130 may determine a factor, associated with a service plan, based on an amount of data associated with the service plan. By way of example, network management system 130 may determine the load of secondary base station 115 by determining a first value based on a first quantity of FWA devices associated with a first service plan, a factor determined based on the first service plan, and the signal strengths measured by the FWA devices; determining a second value based on a second quantity of FWA devices associated with a second service plan, a factor determined based on the second service plan, and the signal strengths measured by the FWA devices; and so on.

For instance, network management system 130 may determine the first value by multiplying the first quantity of FWA devices, the factor determined based on the first service plan, and the signal strengths measured by the FWA devices of the first quantity; determine the second value by multiplying the second quantity of FWA devices, the factor determined based on the second service plan, and the signal strengths measured by the FWA devices of the second quantity; and so on. Network management system 130 may determine the load of secondary base station 115 by combining the values (e.g., the first value, the second value, and so on) into a service plan value. For example, network management system 130 may determine the load of secondary base station 115 by adding the values discussed above.

In some implementations, network management system 130 may determine the load of secondary base station 115 based on the service plan value (described above) and the quantity of mobile devices connected to the first sector. For instance, network management system 130 may determine the load of secondary base station 115 by combining the service plan value (described above) and the quantity of mobile devices (e.g., a combination by way of an addition).

In some examples, network management system 130 may determine a moving average of the quantity of mobile devices based on the different quantities of mobile devices connected to the first sector at different periods of time. In this regard, network management system 130 may determine the load of secondary base station 115 by combining the service plan value (described above) and the moving average of the quantity of mobile devices.

In some instances, network management system 130 may determine a factor based on an amount of data consumed by each mobile device over a period of time (e.g., a combined total amount of data consumed by the mobile devices). Network management system 130 may determine a particular value based on the factor and the moving average of the quantity of mobile devices. For example, network management system 130 may determine the particular value by multiplying the factor and the moving average of the quantity of mobile devices. Network management system 130 may determine the load of secondary base station 115 by combining the service plan value and the particular value (e.g., by way of adding the service plan value and the particular value).

For instance, network management system 130 may determine the load of secondary base station 115 using the following formula:

(FWA(n)*Signal_Strength(n)*Scale(n))+(Scale(Mobile Device)*(Moving Average Number of Mobile Devices))

where FWA(n) represents an FWA device n, where Signal Strength(n) represents the signal strength measured by the FWA device n, where Scale(n) represents the factor associated with the service plan of the FWA device n, where Scale(Mobile Device) represents a factor based on an amount of data consumed by each mobile device, and where Moving Average Number of Mobile Devices is a moving average of the quantity of mobile devices.

As explained above, network management system 130 may perform the calculation for each FWA device and combine (e.g., add) results of the calculations with a result of the calculation of Scale (Mobile Device)*(Moving Average Number of Mobile Devices) to determine the load of secondary base station 115.

While determining the load of secondary base station 115 has been described with respect to multiplication and addition, the load of secondary base station 115 may be determined using other mathematical operations or using a different combination of mathematical operations. Network management system 130 may determine the loads of other secondary base stations in a manner similar to the manner described above in connection with secondary base station 115.

As shown in FIG. 1D, and by reference number 165, network management system 130 may determine signal strength thresholds associated with the base stations based on the loads of the base stations. As an example, the signal strength threshold associated with secondary base station 115 may be predetermined (e.g., determined by a network administrator associated with secondary base station 115 and/or determined based on historical signal strength thresholds, among other examples). The signal strength threshold may be dynamically adjusted based on the load of secondary base station 115. For example, the signal strength threshold may be increased as the load increases. Alternatively, the signal strength threshold may be decreased as the load decreases.

In some examples, the signal strength threshold associated with secondary base station 115 may be determined by multiplying the load of secondary base station 115 by a factor. The factor may be determined by the network administrator associated with secondary base station 115 and/or determined based on historical signal strength thresholds, among other examples. Network management system 130 may determine the signal strength threshold periodically (e.g., every thirty minutes, every hour, among other examples). Network management system 130 may determine the signal strength thresholds of other secondary base stations in a manner similar to the manner described above in connection with secondary base station 115.

As shown in FIG. 1D, and by reference number 170, network management system 130 may provide threshold information regarding the signal strength thresholds associated with the secondary base stations. Additionally, network management system 130 may provide load information regarding the loads of the secondary base stations. For example, after determining the signal strength thresholds associated with the secondary base stations and the loads of the secondary base stations, network management system 130 may provide the threshold information regarding the signal strength thresholds associated with the secondary base stations and/or provide the load information regarding the loads of the secondary base stations.

The threshold information may include the information identifying the secondary base stations and the signal strength thresholds associated with the secondary base stations. Additionally, or alternatively, the threshold information may include information identifying the sectors of the secondary base stations and information identifying devices connected to the sectors. The load information may include information identifying the secondary base stations and the loads of the secondary base stations. Additionally, or alternatively, the load information may include information identifying the sectors of the secondary base stations and information identifying devices connected to the sectors. Network management system 130 may provide the threshold information and/or the load information periodically (e.g., every thirty minutes, every hour, among other examples).

In some implementations, network management system 130 may provide the threshold information and/or the load information to primary base station 105. As an example, network management system 130 may cause the threshold information and/or the load information to be stored in a base station data structure 175 of primary base station 105. In some implementations, the secondary base stations (identified by the threshold information and/or the load information) may be ranked in an order that is based on the loads of the secondary base stations. For example, the secondary base stations may be ranked in an order of increasing load (e.g., from least loaded to most loaded).

Primary base station 105 may be configured to obtain the threshold information and/or the load information by performing a lookup of base station data structure 175. In some implementations, primary base station 105 may be configured to analyze the threshold information and/or the load information and to rank the secondary base stations in an order that is based on the loads of the secondary base stations (if the secondary base stations have not been previously ranked as explained above). For example, primary base station 105 may rank the secondary base stations in an order of increasing load (e.g., from least loaded to most loaded). Subsequently, primary base station 105 may determine whether the ranked secondary base stations are to establish a connection with FWA device 110 based on the signal strength thresholds associated with the ranked secondary base stations, as explained herein.

In some implementations, network management system 130 may provide the threshold information and/or the load information to a load management system data structure. For example, the load management system data structure may be configured to store the threshold information and the load information in association with information identifying primary base station 105. Primary base station 105 may be configured to obtain the threshold information and/or the load information by performing a lookup of the load management system data structure using information identifying primary base station 105.

In some examples, primary base station 105 may perform the lookup based on a trigger (e.g., a notification from network management system 130 indicating that the load information has been stored). Additionally, or alternatively, primary base station 105 may perform the lookup periodically (e.g., every minute, every five minutes, every ten minutes, among other examples). In some implementations, the secondary base stations, identified in the load management system data structure, may be ranked as described above.

Figure 1E:
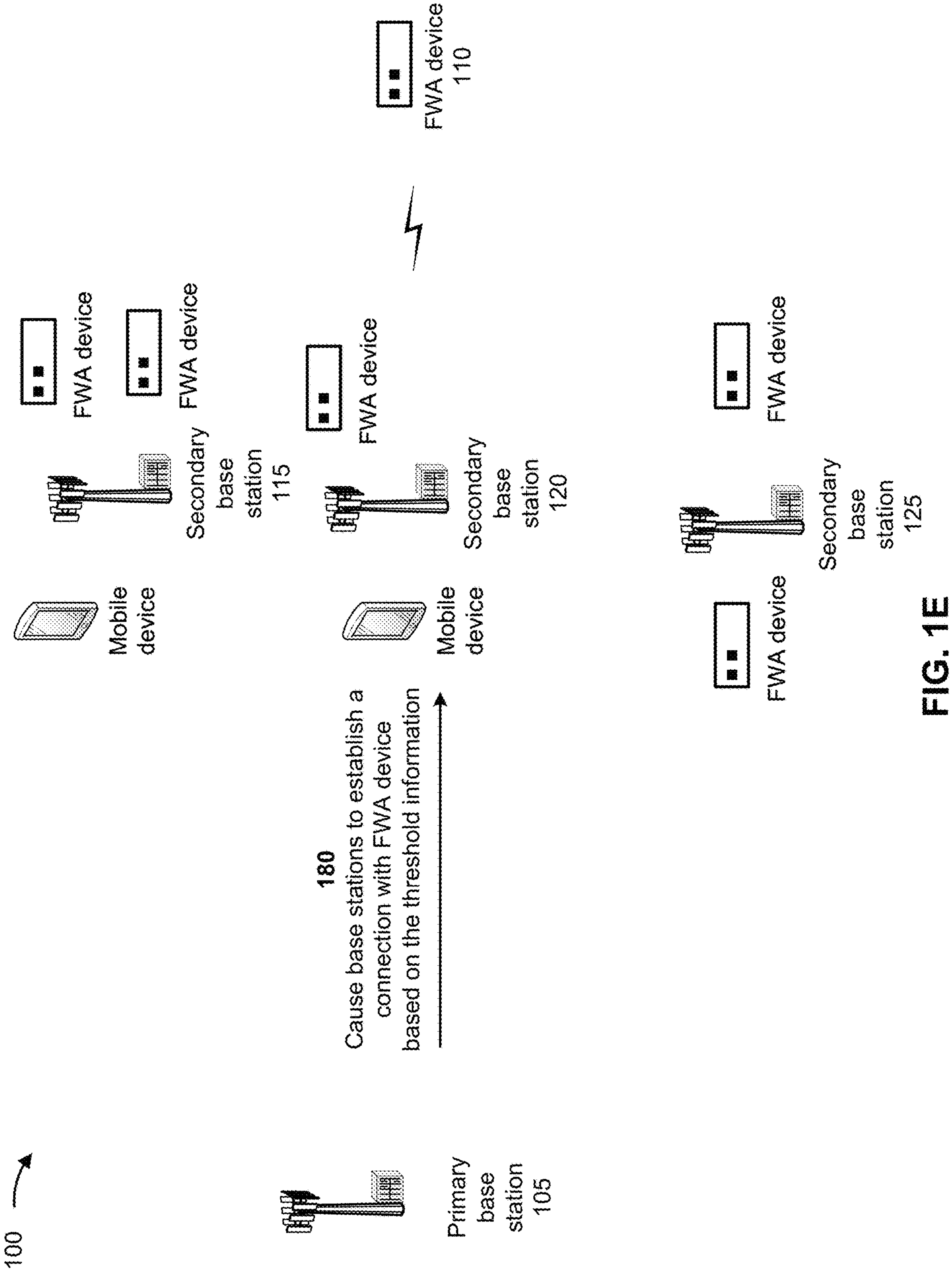

As shown in FIG. 1E, and by reference number 180, primary base station 105 may cause base stations to establish a connection with FWA device 110 based on the threshold information. For example, primary base station 105 may identify a first secondary base station of the ranked secondary base stations (e.g., based on performing a lookup of base station data structure 175 and/or performing a lookup of the load management system data structure). For instance, primary base station 105 may identify secondary base station 115 as a base station with a lowest load from the loads of the secondary base stations and may determine the signal strength of secondary base station 115.

Primary base station 105 may compare the signal strength threshold associated with secondary base station 115 and a signal strength measured by FWA device 110. The signal strength may be measured by FWA device 110 based on signals provided by secondary base station 115, as explained herein. The signal strength may be reported to primary base station 105 by FWA device 110, as explained herein.

Primary base station 105 may cause secondary base station 115 to establish the connection with FWA device 110 based on comparing the signal strength threshold associated with secondary base station 115 and the signal strength measured by FWA device 110. If primary base station 105 determines that the signal strength satisfies the signal strength threshold, primary base station 105 may cause secondary base station 115 to establish the connection with FWA device 110. Alternatively, if primary base station 105 determines that the signal strength does not satisfy the signal strength threshold, primary base station 105 may identify a next secondary base station (of the ranked secondary base stations) and perform actions similar to the actions described in connection with secondary base station 115.

While the foregoing example has been described with respect to a base station establishing a connection with a device as part of a network entry procedure and a base station establishing a connection to act as a secondary source, implementations described herein are also directed to a base station establishing a connection with a device as part of a handover procedure. In this regard, multiple signal strength thresholds may be determined for different types of handover procedures. Implementations described herein are directed to a base station establishing a connection with a device based on a signal strength threshold of the base station. By causing the connection to be established based on the signal strength threshold, implementations described here may preserve the network resources and/or the computing resources, among other resources that would have otherwise been used to reboot the device and/or perform a re-configuration of the device.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
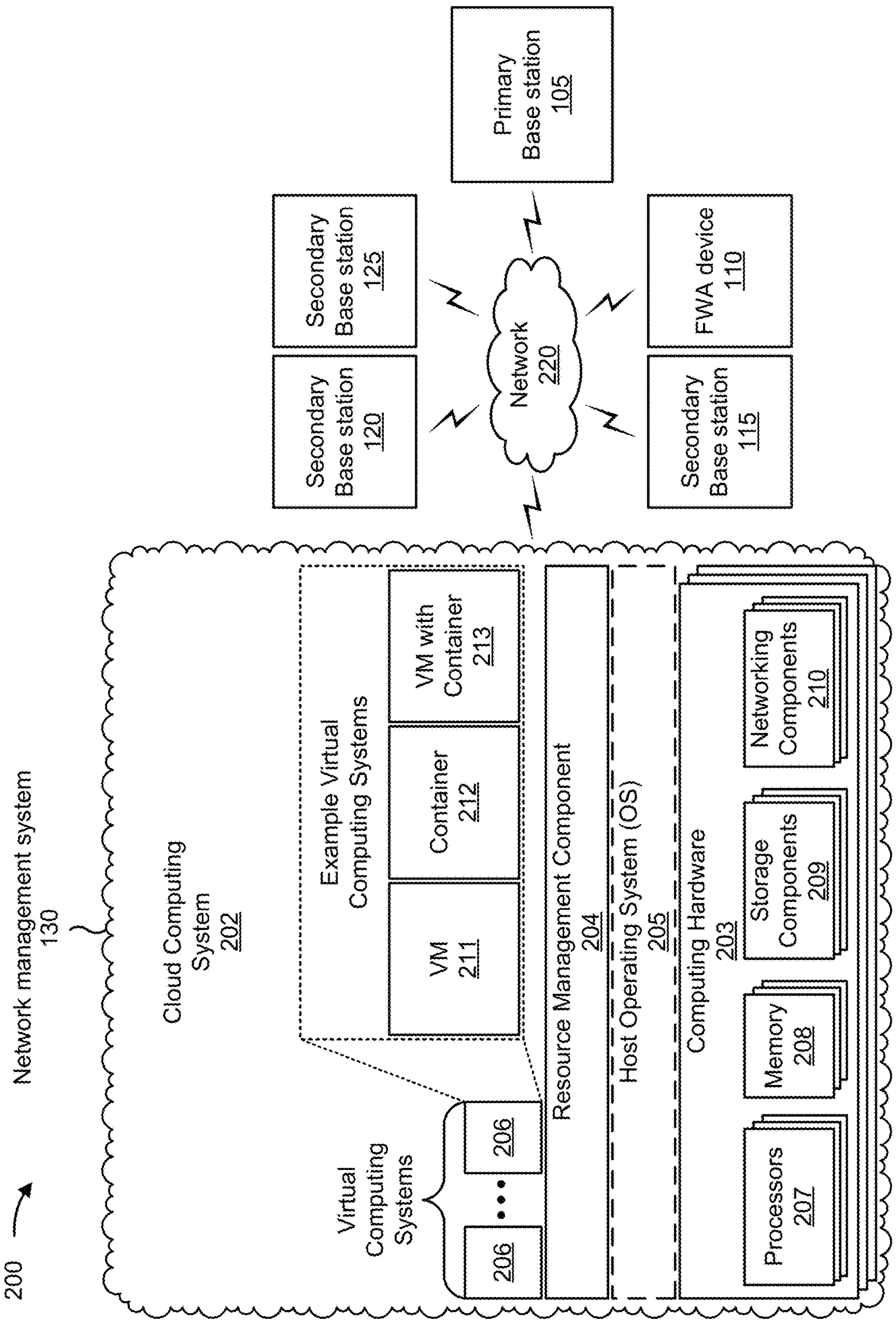
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network management system 130, which may include one or more elements of and/or may execute within a cloud computing system 202. The cloud computing system 202 may include one or more elements 203-213, as described in more detail below. As further shown in FIG. 2, environment 200 may include a network 220, primary base station 105, FWA device 110, secondary base station 115, secondary base station 120, and/or secondary base station 125. Primary base station 105, FWA device 110, secondary base station 115, secondary base station 120, and/or secondary base station 125 have been described above in connection with FIG. 1. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although network management system 130 may include one or more elements 203-213 of the cloud computing system 202, may execute within the cloud computing system 202, and/or may be hosted within the cloud computing system 202, in some implementations, network management system 130 may not be cloud-based (e.g., may be implemented outside of a cloud computing system) or may be partially cloud-based. For example, network management system 130 may include one or more devices that are not part of the cloud computing system 202, such as device 300 of FIG. 3, which may include a standalone server or another type of computing device. Network management system 130 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
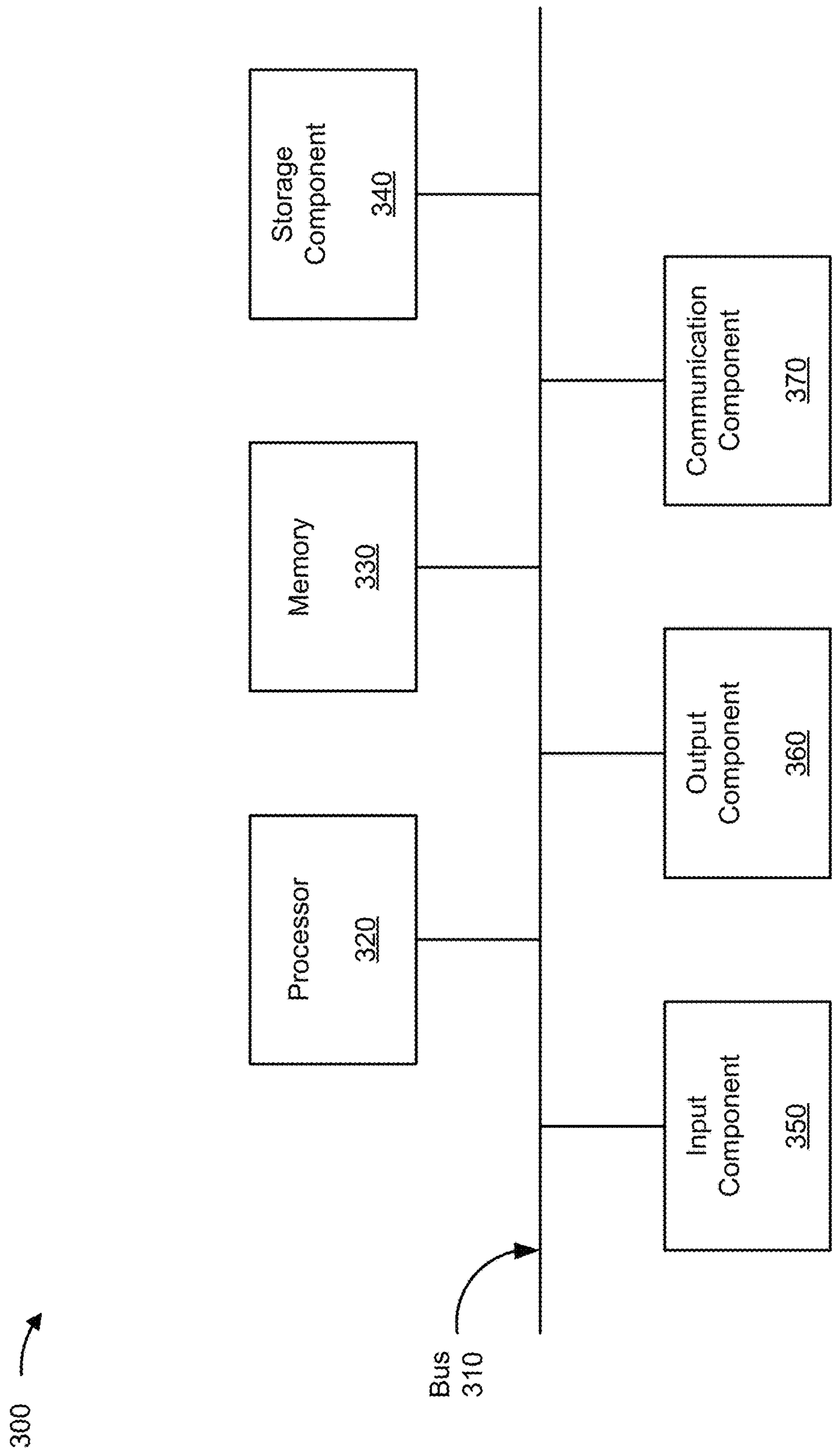
FIG. 3 is a diagram of example components of one or more devices of FIG. 2.

FIG. 3 is a diagram of example components of a device 300, which may correspond to primary base station 105, FWA device 110, secondary base station 115, secondary base station 120, secondary base station 125, and/or network management system 130. In some implementations, primary base station 105, FWA device 110, secondary base station 115, secondary base station 120, secondary base station 125, and/or network management system 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
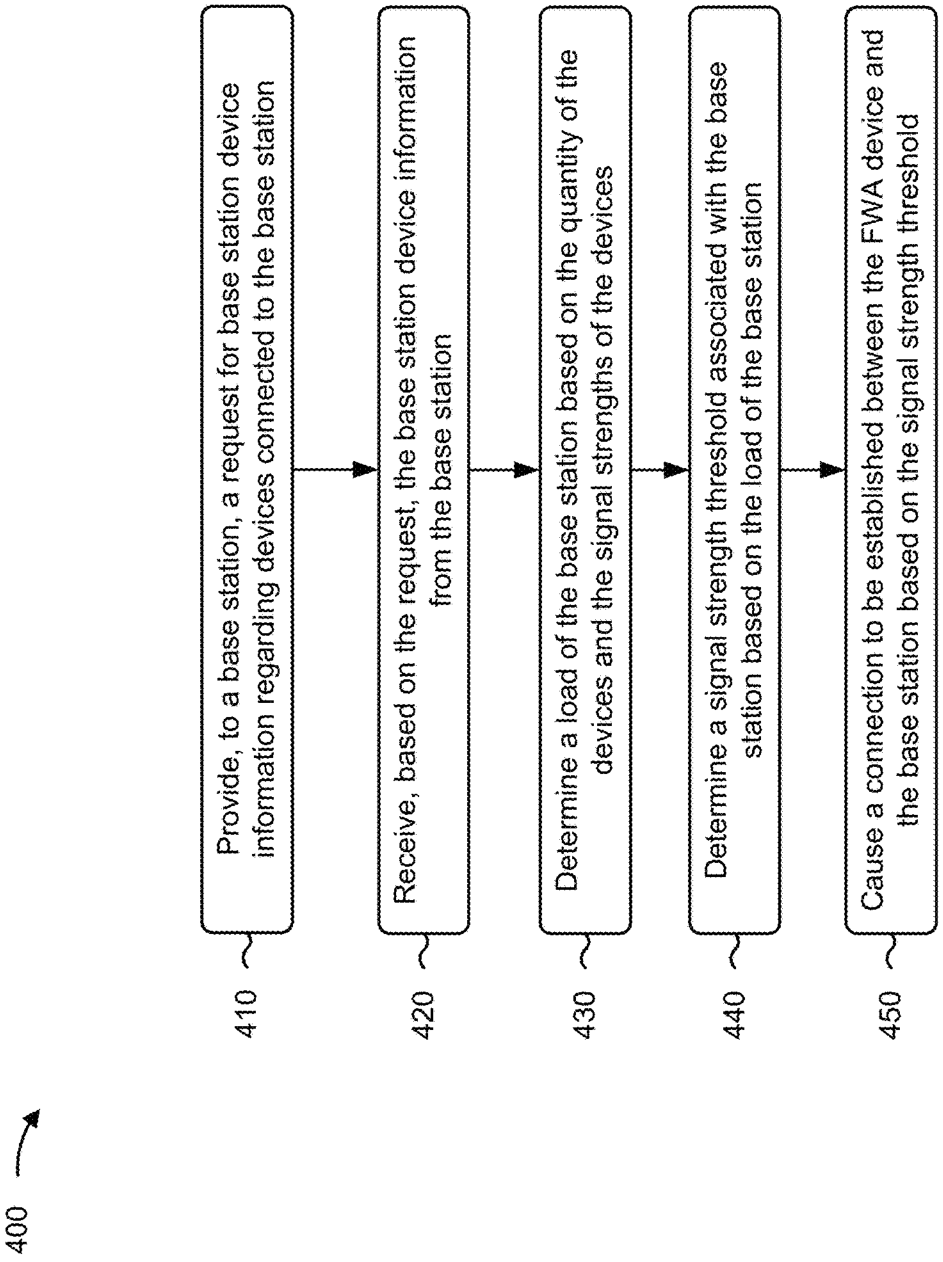
FIG. 4 is a flowchart of an example process relating to connecting devices to a base station based on a signal strength threshold of the base station.

FIG. 4 is a flowchart of an example process 400 relating to connecting devices to a base station based on a signal strength threshold of the base station. In some implementations, one or more process blocks of FIG. 4 may be performed by a network management system (e.g., network management system 130). In some implementations, one or more process blocks of FIG. 4 may be performed by another device or a group of devices separate from or including the network management system, such as a primary base station (e.g., primary base station 105), an FWA device (e.g., FWA device 110), and/or a plurality of secondary base stations (e.g., secondary base station 115, secondary base station 120, and/or secondary base station 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include providing, to a base station, a request for base station device information regarding devices connected to the base station (block 410). For example, the network management system may provide, to a base station, a request for base station device information regarding devices connected to the base station, the base station being identified by a particular device (e.g., an FWA device or a mobile device), as described above.

As further shown in FIG. 4, process 400 may include receiving, based on the request, the base station device information from the base station (block 420). For example, the network management system may receive, based on the request, the base station device information from the base station, the base station device information indicating a quantity of the devices connected to the base station and signal strengths of the devices connected to the base station, as described above.

As further shown in FIG. 4, process 400 may include determining a load of the base station based on the quantity of the devices and the signal strengths of the devices (block 430). For example, the network management system may determine a load of the base station based on the quantity of the devices and the signal strengths of the devices, as described above.

As further shown in FIG. 4, process 400 may include determining a signal strength threshold associated with the base station based on the load of the base station (block 440). For example, the network management system may determine a signal strength threshold associated with the base station based on the load of the base station, as described above.

As further shown in FIG. 4, process 400 may include causing a connection to be established between the FWA device and the base station based on the signal strength threshold (block 450). For example, the network management system may cause a connection to be established between the FWA device and the base station based on the signal strength threshold, as described above.

In some implementations, causing the connection to be established comprises causing the connection to be established between the FWA device and the base station based on the signal strength threshold and a signal strength of the FWA device, wherein the signal strength is based on one or more signals, from the base station, received by the FWA device.

In some implementations, causing the connection to be established comprises determining that the signal strength of the device satisfies the signal strength threshold, and causing the connection to be established between the FWA device and the base station based on determining that the signal strength of the device satisfies the signal strength threshold.

In some implementations, process 400 includes detecting a change in the load of the base station, and adjusting the signal strength threshold based on detecting the change in the load of the base station, wherein adjusting the signal strength threshold comprises increasing the signal strength threshold based on detecting that the load of the base station has increased, or decreasing the signal strength threshold based on detecting that the load of the base station has decreased.

In some implementations, the FWA device is connected to a first base station, wherein the base station is a second base station, and wherein causing the connection to be established comprises providing threshold information, regarding the signal strength threshold, to the first base station, wherein the threshold information is provided to cause the first base station to establish the connection between the FWA device and the second base station.

In some implementations, the first base station is a base station of a Long-Term Evolution (LTE) wireless network, and the second base station is a base station of a Fifth Generation (5G) wireless network.

In some implementations, the devices include FWA devices and mobile devices, and the signal strengths of the devices include signal strengths of the FWA devices without including signal strengths of the mobile devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a network management system, the method comprising:

providing, to a base station, a request for base station device information regarding devices connected to the base station, the base station being identified by a fixed wireless access (FWA) device;

receiving, based on the request, the base station device information from the base station, the base station device information indicating a quantity of the devices connected to the base station and signal strengths of the devices connected to the base station;

determining a load of the base station based on the quantity of the devices and the signal strengths of the devices, wherein determining the load comprises calculating the load using the quantity of the devices, a factor based on a service plan associated with the devices, a moving average of the quantity of the devices, and the signal strengths of the devices;

determining a signal strength threshold associated with the base station based on the load of the base station; and causing a connection to be established between the FWA device and the base station based on the signal strength threshold, wherein the FWA device is configured to establish the connection with the base station to provide Internet access to mobile devices connected with the FWA device.

2. The method of claim 1, wherein causing the connection to be established comprises:

causing the connection to be established between the FWA device and the base station based on the signal strength threshold and a signal strength of the FWA device, wherein the signal strength is based on one or more signals, from the base station, received by the FWA device.

3. The method of claim 2, wherein causing the connection to be established comprises:

determining that the signal strength of the FWA device satisfies the signal strength threshold; and causing the connection to be established between the FWA device and the base station based on determining that the signal strength of the FWA device satisfies the signal strength threshold.

4. The method of claim 1, further comprising:

detecting a change in the load of the base station; and adjusting the signal strength threshold based on detecting the change in the load of the base station, wherein adjusting the signal strength threshold comprises:

increasing the signal strength threshold based on detecting that the load of the base station has increased, or decreasing the signal strength threshold based on detecting that the load of the base station has decreased.

5. The method of claim 1, wherein the FWA device is connected to a first base station, wherein the base station is a second base station, and wherein causing the connection to be established comprises:

providing threshold information, regarding the signal strength threshold, to the first base station, wherein the threshold information is provided to cause the first base station to establish the connection between the FWA device and the second base station.

6. The method of claim 5, wherein the first base station is a base station of a Long-Term Evolution (LTE) wireless network, and wherein the second base station is a base station of a Fifth Generation (5G) wireless network.

7. The method of claim 1, wherein the devices include one or more FWA devices and one or more mobile devices, and wherein the signal strengths of the devices include signal strengths of the one or more FWA devices without including signal strengths of the one or more mobile devices.

8. A device, comprising:

one or more processors configured to:

provide, to a base station, a request for base station device information regarding devices connected to the base station;

receive, based on the request, the base station device information from the base station, the base station device information indicating that fixed wireless access (FWA) devices are connected to the base station, indicating a quantity of the FWA devices connected to the base station, and indicating signal strengths of the FWA devices connected to the base station;

determine a load of the base station, wherein the one or more processors, to determine the load, are configured to calculate the load using the quantity of the FWA devices, a factor based on a service plan associated with the FWA devices, a moving average of the quantity of the FWA devices, and the signal strengths of the FWA devices;

determine a signal strength threshold associated with the base station based on the load of the base station; and cause a connection to be established between a FWA device and the base station based on the signal strength threshold, wherein the FWA device is configured to establish the connection with the base station to provide Internet access to mobile devices connected with the FWA device.

9. The device of claim 8, wherein the device is a first base station, wherein the base station is a second base station, wherein the FWA device is connected to the first base station prior to the request being provided; and wherein the one or more processors, to cause the connection to be established, are configured to:

cause a handover to be performed to disconnect the FWA device from the first base station and to connect the FWA device to the second base station.

10. The device of claim 8, wherein the FWA device is connected to a first base station, wherein the base station is a second base station, and wherein the one or more processors, to cause the connection to be established, are configured to:

provide threshold information, regarding the signal strength threshold, to the first base station, wherein the threshold information is provided to cause the first base station to establish the connection to be established between the FWA device and the second base station.

11. The device of claim 10, wherein the first base station is a base station of a Long-Term Evolution (LTE) wireless network, and wherein the second base station is a base station of a Fifth Generation (5G) wireless network.

12. The device of claim 8, wherein the one or more processors, to cause the connection to be established, are configured to:

cause the connection to be established between the FWA device and the base station based on a signal strength, of the FWA device, satisfying the signal strength threshold, wherein the signal strength is based on one or more signals, from the base station, received by the FWA device.

13. The device of claim 8, wherein the one or more processors are further configured to:

increase the signal strength threshold based on the load of the base station increasing; or decrease the signal strength threshold based on the load of the base station decreasing.

14. The device of claim 8, wherein the base station device information indicates a quantity of mobile devices that are connected to the base station, and wherein the one or more processors, to determine the load, are configured to:

determine a moving average of the quantity of the mobile devices; and determine the load based on the quantity of the FWA devices, the signal strengths of the FWA devices, and the moving average of the quantity of mobile devices.

15. A non-transitory computer-readable medium storing a set of instructions, the set of instructions comprising:

one or more instructions that, when executed by one or more processors of a device, cause the device to:

provide, to a base station, a request for base station device information regarding devices connected to the base station, receive, based on the request, the base station device information from the base station, the base station device information indicating a quantity of the devices connected to the base station and indicating signal strengths of the devices connected to the base station;

determine a load of the base station based on the quantity of the devices and the signal strengths of the devices, wherein the one or more instructions, that cause the device to determine the load of the base station, cause the device to calculate the load using the quantity of the devices, a factor based on a service plan associated with the devices, a moving average of the quantity of the devices, and the signal strengths of the devices;

determine a signal strength threshold based on the load of the base station; and cause a connection to be established between a fixed wireless access (FWA) device and the base station based on the signal strength threshold, wherein the FWA device is configured to establish the connection with the base station to provide Internet access to one or more mobile devices connected with the FWA device.

16. The non-transitory computer-readable medium of claim 15, wherein the base station is a base station of a Fifth Generation (5G) wireless network, wherein the quantity of the devices includes a quantity of FWA devices and a quantity of mobile devices, wherein the factor includes a first factor based on a service plan associated with the FWA devices and a second factor based on a service plan associated with the mobile devices, and wherein the load is calculated using the quantity of the devices, the first factor, the second factor, and the signal strengths of the devices.

17. The non-transitory computer-readable medium of claim 15, wherein the one or more instructions, that cause the device to cause the connection to be established, cause the device to:

cause the connection to be established between the FWA device and the base station based on the signal strength threshold and a signal strength of the FWA device, wherein the signal strength is based on signals, from the base station, received by the FWA device.

18. The non-transitory computer-readable medium of claim 15, wherein the one or more instructions further cause the device to:

increase the signal strength threshold based on the load of the base station increasing; or decrease the signal strength threshold based on the load of the base station decreasing.

19. The non-transitory computer-readable medium of claim 15, wherein the quantity of the devices includes a quantity of FWA devices and a quantity of mobile devices connected to the base station, wherein the signal strengths of the devices include signal strengths of the FWA devices, and wherein the one or more instructions, that cause the device to determine the load, cause the device to:

determine the moving average of the quantity of the mobile devices.

20. The non-transitory computer-readable medium of claim 19, wherein the one or more instructions, that cause the device to determine the load, cause the device to:

determine a first factor based on each service plan associated with the FWA devices;

determine a second factor based on each service plan associated with the mobile devices, wherein the factor includes the first factor and the second factor; and determine the load based on the quantity of the FWA devices, the signal strengths of the FWA devices, the first factor based on each service plan associated with the FWA devices, the moving average of the quantity of the mobile devices, and the second factor based on each service plan associated with the mobile devices.

* * * * *